United States Patent
Vander Helm et al.

(10) Patent No.: US 10,262,467 B2
(45) Date of Patent: Apr. 16, 2019

(54) SUSTAINABLE REAL-TIME PARKING AVAILABILITY SYSTEM

(71) Applicant: Park Green, LLC, Sioux Center, IA (US)

(72) Inventors: Warren C. Vander Helm, Sioux Center, IA (US); David L. Vogel, Sioux Center, IA (US); Michael T. Holm, Sioux Center, IA (US)

(73) Assignee: Park Green, LLC, Sioux Center, IA (US)

( * ) Notice: Subject to any disclaimer, the term of this patent is extended or adjusted under 35 U.S.C. 154(b) by 47 days.

(21) Appl. No.: 14/821,074

(22) Filed: Aug. 7, 2015

(65) Prior Publication Data

US 2017/0039779 A1    Feb. 9, 2017

(51) Int. Cl.
*G08G 1/14*    (2006.01)
*G07B 15/02*    (2011.01)

(52) U.S. Cl.
CPC .............. *G07B 15/02* (2013.01); *G08G 1/142* (2013.01); *G08G 1/144* (2013.01); *G08G 1/146* (2013.01)

(58) Field of Classification Search
CPC ........ G07B 15/02; G08G 1/142; G08G 1/144; G08G 1/146
See application file for complete search history.

(56) References Cited

U.S. PATENT DOCUMENTS 5,832,454 A  *  11/1998  Jafri ..................... G06Q 10/02
                                                          705/6
7,617,136 B1 *  11/2009  Lessing ................ G06Q 10/087
                                                          705/22
(Continued)

FOREIGN PATENT DOCUMENTS

KR    20140118361 A    10/2014
WO    WO 2014080388 A2 *  5/2014 ........... B64C 39/024
(Continued)

OTHER PUBLICATIONS

Danny, Ecker, "Moneyball: Cubs team up with Sox in offering 'dynamic' ticket prices", published by www.chicagobusiness.com on Feb. 18, 2012.*
Idris, "Parking Guidance System Utilizing Wireless Sensor Network and Ultrasonic Sensor", published by Information Technology Journal 8, 2009, p. 138-146 (Year: 2009).*

* cited by examiner

*Primary Examiner* — Brian M Epstein
*Assistant Examiner* — Omar Zeroual
(74) *Attorney, Agent, or Firm* — Luke Charles Holst McGrath North Mullin & Kratz PC LLO (57)    ABSTRACT

The present invention relates in general to parking availability systems and methods of parking, and more specifically, to a parking system that manages individual parking spaces in real-time. Notably, the present invention gives a parking asset owner flexibility to adjust parking prices for individual parking spaces within a parking facility in real-time depending upon dynamic market conditions such as demand, convenience, and location. The purpose of the invention is to offer parking consumers a choice in parking price tiers to encourage turnover and maximize revenue streams for the parking asset owner. Additional benefits of the present invention to the parking asset owner include improved service to customers, obtaining LEED credits, reducing harmful carbon emissions, mitigating transportation demand, saving time through stream-lined parking operations, and eco-friendly solutions to parking problems not solved by traditional parking models.

19 Claims, 7 Drawing Sheets

(56) References Cited

U.S. PATENT DOCUMENTS

| | | | | |
|---|---|---|---|---|
| 7,889,099 B2* | 2/2011 | Aubrey | G07B 15/02 | 340/905 |
| 7,956,769 B1* | 6/2011 | Pearl | G08G 1/14 | 340/539.1 |
| 8,190,457 B1* | 5/2012 | Chandler | G06Q 10/02 | 705/5 |
| 8,332,260 B1* | 12/2012 | Mysen | G06Q 30/02 | 380/231 |
| 9,123,034 B2* | 9/2015 | Rydbeck | G06Q 20/145 | |
| 2002/0099574 A1* | 7/2002 | Cahill | G06Q 10/02 | 705/5 |
| 2002/0161610 A1* | 10/2002 | Walker | G06Q 10/02 | 705/5 |
| 2003/0144890 A1 | 7/2003 | Dan | | |
| 2004/0068433 A1* | 4/2004 | Chatterjee | G06Q 20/127 | 705/13 |
| 2004/0252034 A1* | 12/2004 | Slemmer | G08G 1/14 | 340/932.2 |
| 2005/0096974 A1* | 5/2005 | Chagoly | G08G 1/14 | 705/13 |
| 2005/0177432 A1* | 8/2005 | Nevergole | G06Q 20/20 | 705/16 |
| 2005/0228702 A1* | 10/2005 | Fairbanks | G06Q 10/02 | 705/5 |
| 2005/0280555 A1* | 12/2005 | Warner, IV | G08G 1/14 | 340/932.2 |
| 2006/0015397 A1* | 1/2006 | Vitrano, Jr. | G06Q 10/02 | 705/13 |
| 2006/0250278 A1* | 11/2006 | Tillotson | G08G 1/14 | 340/932.2 |
| 2007/0040701 A1* | 2/2007 | Browne | G08G 1/14 | 340/932.2 |
| 2007/0257106 A1* | 11/2007 | Sarkany | G06Q 30/06 | 235/380 |
| 2007/0290888 A1* | 12/2007 | Reif | G07B 15/02 | 340/932.2 |
| 2009/0087290 A1* | 4/2009 | Wastel | B66F 7/02 | 414/240 |
| 2010/0030591 A1* | 2/2010 | Viard | G06Q 10/02 | 705/5 |
| 2010/0052946 A1* | 3/2010 | Levine | G08G 1/143 | 340/932.2 |
| 2010/0069148 A1* | 3/2010 | Cargill | A63B 71/0622 | 463/25 |
| 2011/0004507 A1* | 1/2011 | Potkonjak | G06Q 10/06375 | 705/7.37 |
| 2011/0166897 A1* | 7/2011 | Beckman | G06Q 10/02 | 705/5 |
| 2011/0213672 A1* | 9/2011 | Redmann | G06Q 20/209 | 705/24 |
| 2011/0231212 A1* | 9/2011 | Hurley | G06Q 10/02 | 705/5 |
| 2011/0238460 A1* | 9/2011 | Al-Dawsari | G06Q 10/06 | 705/7.31 |
| 2011/0270669 A1* | 11/2011 | Rowe | G06Q 30/02 | 705/14.37 |
| 2011/0320256 A1* | 12/2011 | Florucci | G06Q 30/0226 | 705/14.33 |
| 2012/0035966 A1* | 2/2012 | Maguire | G06Q 10/02 | 705/5 |
| 2012/0092190 A1* | 4/2012 | Stefik | G06Q 10/02 | 340/932.2 |
| 2012/0095791 A1* | 4/2012 | Stefik | G06Q 10/02 | 705/5 |
| 2012/0152654 A1* | 6/2012 | Marcus | A62B 5/00 | 182/129 |
| 2012/0161985 A1* | 6/2012 | Amir | G01C 21/3685 | 340/932.2 |
| 2012/0188101 A1* | 7/2012 | Ganot | G07B 15/02 | 340/932.2 |
| 2012/0245981 A1* | 9/2012 | Volz | G07B 15/02 | 705/13 |
| 2012/0274482 A1* | 11/2012 | Chen | G08G 1/144 | 340/932.2 |
| 2012/0280793 A1* | 11/2012 | Fayfield | G08G 1/142 | 340/8.1 |
| 2012/0284209 A1* | 11/2012 | Duffy | G07B 15/02 | 705/418 |
| 2012/0310712 A1* | 12/2012 | Baughman | G07B 15/02 | 705/13 |
| 2012/0323643 A1* | 12/2012 | Volz | G07B 15/02 | 705/13 |
| 2013/0113936 A1* | 5/2013 | Cohen | G07B 15/02 | 348/148 |
| 2013/0143536 A1 | 6/2013 | Ratti | | |
| 2013/0191189 A1* | 7/2013 | Aparicio | G07B 15/02 | 705/13 |
| 2013/0268187 A1* | 10/2013 | Scofield | G01C 21/3685 | 701/400 |
| 2014/0046874 A1* | 2/2014 | Li | G07B 15/02 | 705/418 |
| 2014/0058711 A1* | 2/2014 | Scofield | G06Q 10/04 | 703/6 |
| 2014/0122375 A1* | 5/2014 | Li | G07B 15/02 | 705/418 |
| 2014/0176349 A1* | 6/2014 | Smullin | G08G 1/142 | 340/932.2 |
| 2014/0195282 A1 | 7/2014 | Stefik et al. | | |
| 2014/0214499 A1* | 7/2014 | Hudson | G07F 17/246 | 705/13 |
| 2014/0257925 A1* | 9/2014 | Tracy | G06Q 30/0202 | 705/7.31 |
| 2014/0278081 A1* | 9/2014 | Iwuchukwu | G01C 21/3679 | 701/519 |
| 2014/0302875 A1* | 10/2014 | Beaurepaire | G08G 1/143 | 455/456.3 |
| 2014/0309924 A1* | 10/2014 | Varoglu | G01C 21/206 | 701/410 |
| 2014/0313058 A1* | 10/2014 | Chen | G08G 1/141 | 340/932.2 |
| 2014/0344026 A1 | 11/2014 | Outwater et al. | | |
| 2014/0354453 A1 | 12/2014 | Fourie | | |
| 2015/0138001 A1* | 5/2015 | Davies | G08G 1/149 | 340/932.2 |
| 2015/0279213 A1* | 10/2015 | Balter | G08G 1/144 | 705/13 |
| 2015/0324709 A1* | 11/2015 | Krivacic | G06Q 10/02 | 705/5 |
| 2016/0061618 A1* | 3/2016 | Benenson | G06F 17/3087 | 701/428 |
| 2016/0133134 A1* | 5/2016 | Todasco | G07B 15/02 | 705/13 |
| 2016/0140846 A1* | 5/2016 | Outwater | G08G 1/144 | 340/932.2 |
| 2016/0171891 A1* | 6/2016 | Banatwala | G07B 15/02 | 340/932.2 |
| 2016/0189435 A1* | 6/2016 | Beaurepaire | G05D 1/021 | 705/13 |
| 2016/0196747 A1* | 7/2016 | Tsyrklevich | G08G 1/143 | 701/532 |
| 2016/0306535 A1* | 10/2016 | Krishnamoorthy | G06T 7/73 | |
| 2016/0379495 A1* | 12/2016 | Engelen | G08G 1/005 | 340/932.2 |
| 2017/0178511 A1* | 6/2017 | Berns | G08G 1/142 | |

FOREIGN PATENT DOCUMENTS

| | | | | |
|---|---|---|---|---|
| WO | WO-2014080388 A2 * | 5/2014 | | B64C 39/024 |
| WO | WO 2015172161 A1 * | 11/2015 | | G07B 15/02 |
| WO | WO-2015172161 A1 * | 11/2015 | | G07B 15/02 |
| WO | WO 2016193690 A1 * | 12/2016 | | B64C 29/0016 |
| WO | WO-2016193690 A1 * | 12/2016 | | B64C 29/0016 |

ONE SIZE FITS ALL BUSINESS MODEL

| # Spaces | Daily Turnover | Per Hour | Average Ticket | Daily Revenue |
|---|---|---|---|---|
| 100 | 2 | $ 3.00 | $ 12.00 | $ 2,400 |
| 0 | 0 | $ - | $ - | 0 |
| 0 | 0 | $ - | $ - | 0 |
| Traditional Theoretical Revenue Daily Total | | | | $ 2,400 |

GIVE CONSUMERS A CHOICE BUSINESS MODEL

| # Spaces | Daily Turnover | Per Hour | Average Ticket | Daily Revenue |
|---|---|---|---|---|
| ($) 70 | 2 | $ 2.50 | $ 10.00 | ($) 1,400 |
| ($$) 25 | 2.5 | $ 8.00 | $ 21.00 | ($$) 1,313 |
| ($$$) 5 | 5 | $ 18.00 | $ 24.00 | ($$$) 600 |
| Tiered Pricing Theoretical Revenue Daily Total | | | | $ 3,313 |
| Upside Revenue Gain | | | | $ 913 |

FIG. 7

SUSTAINABLE REAL-TIME PARKING AVAILABILITY SYSTEM

FIELD OF THE INVENTION

The present invention relates in general to a sustainable, real-time parking availability system, and more specifically, to a parking system that manages individual parking spaces in real-time using fluctuating market rates based on demand, convenience, and location. The purpose of the invention is to offer parking consumers a choice in parking price tiers to encourage turnover and maximize revenue streams for the parking asset owner.

BACKGROUND OF THE INVENTION

With cities increasing in size and density, urban parking today in the United States has become a $23 billion dollar industry. The reason for this is simple—parking in dense metropolitan areas is difficult, time-consuming, and expensive. Not only is searching for a vacant—let alone convenient—parking space frustrating for the driver, it is often linked to many additional problems negatively affecting the quality of urban life. For example, the absence of available parking accounts for approximately forty percent of the congestion associated with city driving—contributing to air pollution, driving hazards, and a higher cost of living for city dwellers. For these reasons, parking assets have become a valuable commodity and a source of revenue for city governments, businesses, and owners. Indeed, urban designers now recognize that a well-planned, convenient, and safe parking plan may increase a building's value by fifteen to forty percent in an metropolitan setting. Thus, parking asset owners are beginning to treat their parking facilities as the front doors to their property—the de facto first and last impression on patrons.

In an attempt to allocate parking commodities and reap their potential benefits, cities develop and enforce parking policies aimed at balancing the needs of residents, employers, merchants, and visitors. Traditionally, these parking policies involved a parking consumer spending a fixed amount of money on a parking space for a specified time period, without regard to the location, time of day, or total time spent using the parking space. Thus, the average parking experience required a parking consumer to pay the same price as everyone else, irrespective of whether that parking consumer had the best parking space or the worst.

Over the last few years, major metropolitans have initiated "smart" parking systems in order to reduce parking shortages, raise revenue, and improve urban livability by using sensors, smart phones, and credit cards. However, common problems with "smart" parking systems are that they remain static and do not manage individual parking spaces in "real-time." Thus, changing conditions such as demand, time of day, availability, and the special needs or characteristics of a particular parking consumer are not taken into account. Consequently, a parking consumer pays the same price for an inconveniently located parking space as another parking consumer pays for a premium location. Such parking practices discourage rapid turnover of premium parking spaces, increase cruising and carbon emissions while searching for a conveniently located parking space, and disregards a valuable revenue scheme. Another disadvantage is that such systems require an attendant to monitor groups of parking spaces and initiate penalties—often in the form of parking tickets—to discourage parking policy violations. Thus, costs of enforcement and penalties are added burdens for parking consumers that visit, live, and work in large cities.

Thus, a desire remains to develop a green parking system that manages individual parking spaces in real-time and therefore adapts to constantly changing conditions and market demands to provide parking consumers a choice in premium parking to encourage rapid turnover and reduce carbon emissions.

BRIEF SUMMARY OF THE INVENTION

Therefore, it is a principal object, feature, and/or advantage of the present invention to overcome the aforementioned deficiencies in the art and provide a parking system that gives parking consumers a choice in individual parking spaces set at various price options.

Another object, feature, and/or advantage of the present invention is to provide a parking system that manages individual parking spaces in real-time.

Yet another object, feature, and/or advantage of the present invention is to provide a parking system that charges market rates on individual parking spaces based on demand.

A further object, feature, and/or advantage of the present invention is to provide a green parking system that reduces cruising time and lowers carbon emissions.

A still further object, feature, and/or advantage of the present invention is to provide a parking system that donates a percentage of its revenue to charity.

An object, feature, and/or advantage of the present invention is to provide a parking system that adapts in real-time to constantly changing market conditions and parking consumer demands.

Another object, feature, and/or advantage of the present invention is to provide a parking system that encourages rapid turnover of premium parking spaces.

Yet another object, feature, and/or advantage of the present invention is to provide a parking system that gives parking consumers a choice of individual parking spaces based on location, number of car occupants, walking distance, day of the week, time of the day, personal safety, convenience, price, age of the parking consumer, and/or weather.

A further object, feature, and/or advantage of the present invention is to provide a parking system that is easy to manufacture.

A still further object, feature, and/or advantage of the present invention is to provide a parking system that is easy to use.

An object, feature, and/or advantage of the present invention is to provide a parking system that does not require an attendant to monitor parking spaces.

Another object, feature, and/or advantage of the present invention is to provide a parking system that does not require an attendant to initiate penalties to discourage parking policy violations.

Yet another object, feature, and/or advantage of the present invention is to provide a method of parking using the parking system of the present invention.

A further object, feature, and/or advantage of the present invention is to provide a database for parking asset owners to strategically update and enhance additional operations by incorporating the parking system of the present invention across their parking asset portfolio.

A still further object, feature, and/or advantage of the present invention is to utilize unmanned aerial vehicle ("UAV") and/or unmanned aerial systems ("UAS") technology as a guidance tool to direct parking consumers to individual parking spaces within a parking facility.

An object, feature, and/or advantage of the present invention is to provide a parking system that utilizes a parking ambassador.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a real-time parking availability system is provided. Notably, individual parking spaces in the real-time parking availability system may be managed and sold as individual units, rather than as in groups of spaces (e.g., bays). These individual parking spaces may be marketed and priced separately in real-time using dynamic market conditions. The real-time parking availability system of the present invention offers parking consumers a choice in tiered pricing based on the dynamic market conditions. Parking rate notifications may also be provided, listing current parking rates for the various pricing tiers within a parking facility. A parking selection device may display the current parking prices in each pricing tier for the parking facility, and is configured to allow a parking consumer to select a pricing tier of choice for parking their vehicle. The real-time parking availability system determines in real-time whether an individual parking space is available in the parking tier of choice selected by the parking consumer. If an individual parking space is available in the parking tier of choice, the parking consumer is directed to the available parking space. On the other hand, if an individual parking space is not available in the parking tier of choice, the parking availability system creates more parking spaces within the pricing tier of choice and/or raises prices for the pricing tier in highest demand within the parking facility.

According to another aspect of the present invention, a method of parking using the parking availability system of the present invention is provided. The method includes providing a parking consumer and parking facility. The method further includes providing a parking availability system. The method makes a determination in real-time whether an individual parking space is available in the parking tier of choice selected by the parking consumer. If an individual parking space is available in the parking tier of choice, the parking consumer is directed to the available parking space. Otherwise, if an individual parking space is not available in the parking tier of choice, the parking availability system creates more parking spaces within the pricing tier of choice; and/or raises prices for the pricing tier in highest demand within the parking facility. The method further comprises directing the parking consumer to an available parking space.

Different aspects may meet different objectives of the invention. Other objectives and advantages of this invention will be more apparent in the following detailed description taken in conjunction with the figures. The present invention is not to be limited by or to these objects or aspects.

DESCRIPTION OF FIGURES

FIGS. 1-7 represent real-time parking availability systems of the present invention, and a method of parking utilizing the present invention.

DETAILED DESCRIPTION OF THE INVENTION

Figure 1:
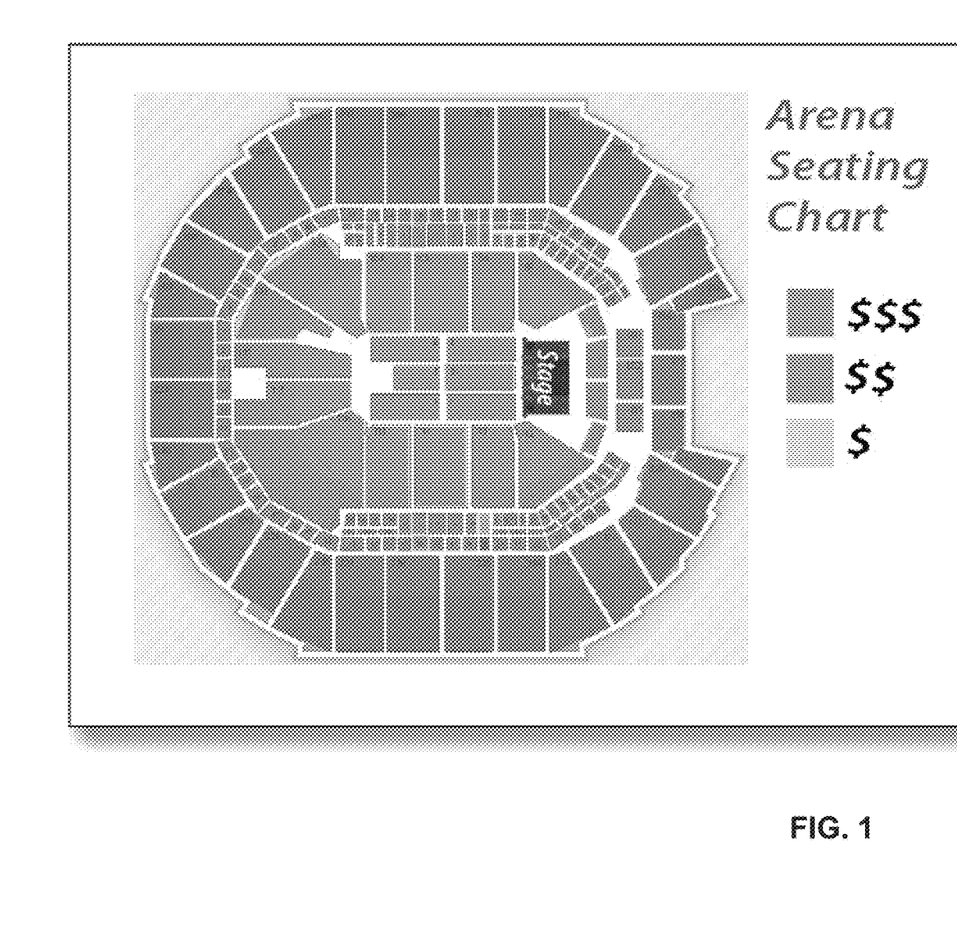
FIG. 1 is an analogous view of a traditional parking system currently used in the market.
Figure 2:
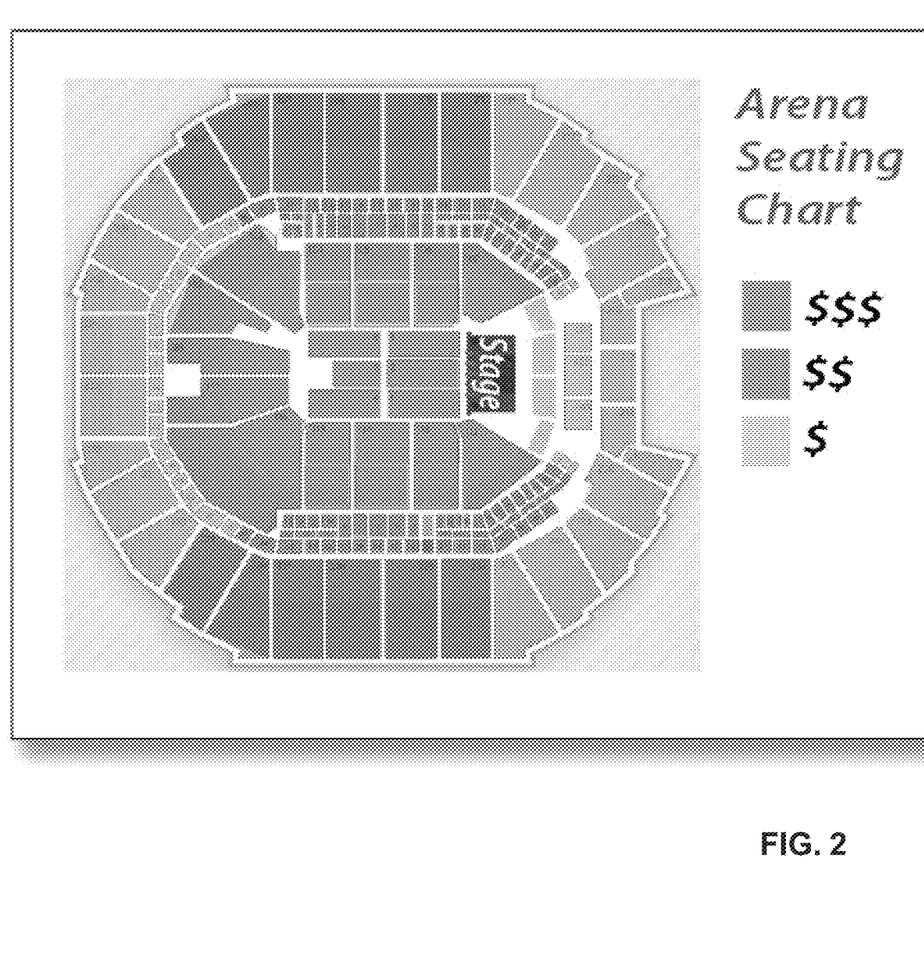
FIG. 2 is an analogous view of one aspect of the parking availability system and method of the present invention.

Traditionally, parking assets have been viewed under a one-size fits-all mentality. Akin to a concert arena, first row seats—or premium parking spaces—were priced the same as the nose-bleed section. See FIG. 1. Thus, the average parking experience required a parking consumer to pay the same price as everyone else, irrespective of whether that parking consumer had the best parking space or the worst. Thus, the traditional model discouraged the turnover of premium parking spaces and left valuable revenue streams untapped for the parking asset owner. On the other hand, the present invention turns the traditional parking model into a viable market-driven parking system and method that manages individual parking spaces in real-time with fluctuating market rates based on demand, convenience, and location. Returning to the concert arena analogy, a purpose of the present invention is to offer parking consumers a choice in parking prices to encourage turnover and maximize revenue streams for the parking asset owner. See, e.g., FIG. 2.

Figure 3:
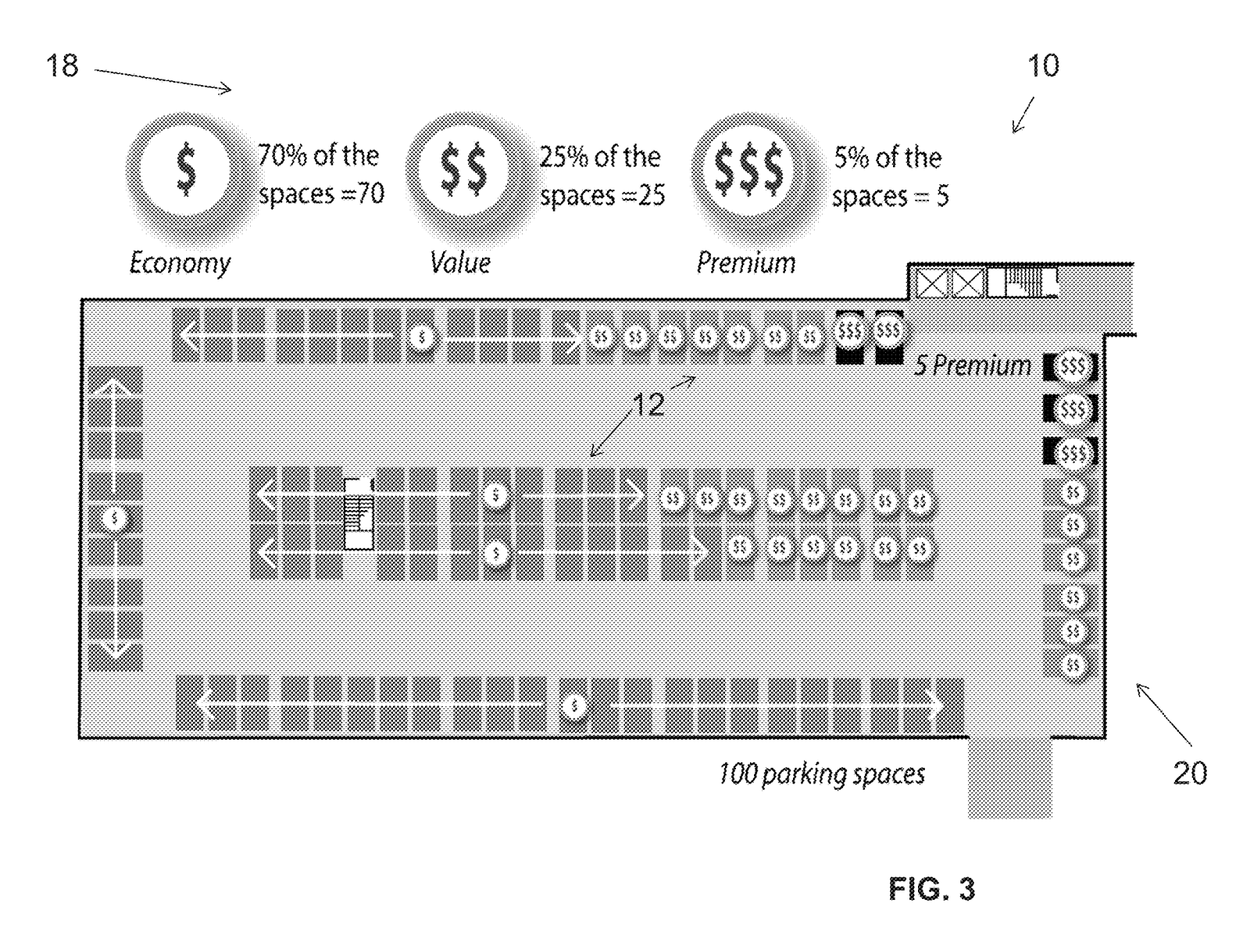
FIG. 3 is a view of the parking availability system and method of the present invention.

Illustrated in FIG. 3 is one aspect of a real-time parking availability system 10 of the present invention. Notably, a plurality of individual parking spaces 12 in the real-time parking availability system 10 may be managed and sold as individual units, rather than as in groups of spaces (e.g., bays) as managed and sold in traditional parking models. These individual parking spaces 12 may be marketed and priced separately in real-time using dynamic market conditions. These market conditions may include: demand; location of the parking space; walking distance to street level, stairwell, skywalk, elevator, or attached businesses; time of day; day of the week; holidays; special events; number of car occupants; personal safety; convenience; age of the parking consumer; weather conditions; and/or combinations thereof. Thus, the real-time parking availability system 10 of the present invention offers parking consumers 16 a choice in tiered pricing 18 based on rapidly changing market conditions. For example, the top tier of the tiered pricing 18 may include premium parking spaces that are therefore priced expensively ($$$) to encourage rapid turnover. The second tier of the tiered pricing 18 may include value parking spaces that are therefore priced moderately ($$) to encourage a reasonable parking duration. The third tier of the tiered pricing 18 may include economy parking spaces that are therefore priced inexpensively ($) to allow for a longer parking duration. Notably, the pricing tier 18 in highest demand could be any pricing tier 18, not merely the most expensive, and therefore depends on rapidly changing market conditions.

Further shown in FIG. 3 and Example 1, the real-time parking availability system 10 of the present invention may comprise a plurality of individual parking spaces 12 in a single parking facility 20 (e.g., parking garage). Depending on the size of the parking facility 20, the real-time parking availability system 10 may distribute the individual parking spaces into 3-6 pricing tiers 18 with default parking prices.

Example 1

A parking facility includes 100 self-park parking spaces total, wherein the parking spaces may be priced according to a default three tiered pricing distribution plan:
- 70% of the total parking spaces are allocated to the economy ($) pricing tier;
- 25% of the total parking spaces are allocated to the value ($$) pricing tier; and
- 5% of the total parking spaces are allocated to the premium ($$S) pricing tier.

The parking asset owner may change the default prices and the distribution of individual parking spaces 12 within each pricing tier 18 to whatever is desired. Depending on events and market conditions, demand will drive the total number of parking spaces 12 in each pricing tier 18 and the price of individual spaces 12 within the pricing tier 18, wherein the price may change hourly, daily, weekly, biweekly, monthly, or seasonally for individual spaces 12 within the parking facility 20. It is understood in the present invention 10 that the default pricing tiers 18, prices, and number of individual parking spaces 12 within each pricing tier 18 may be determined and set by the owner of the parking facility 20 as desired, and are not to be limited by Example 1. Notably, the individual parking spaces 12 within the pricing tiers 18 of the parking facility 20 are not separated into nested areas or detached parking bays with exclusive gated entries. Thus, the real-time parking availability system 10 of the present invention is flexible in allowing individual parking spaces 12 within the parking facility 20 to fluctuate between different pricing tiers 18 based on dynamic market conditions.

Figure 4:
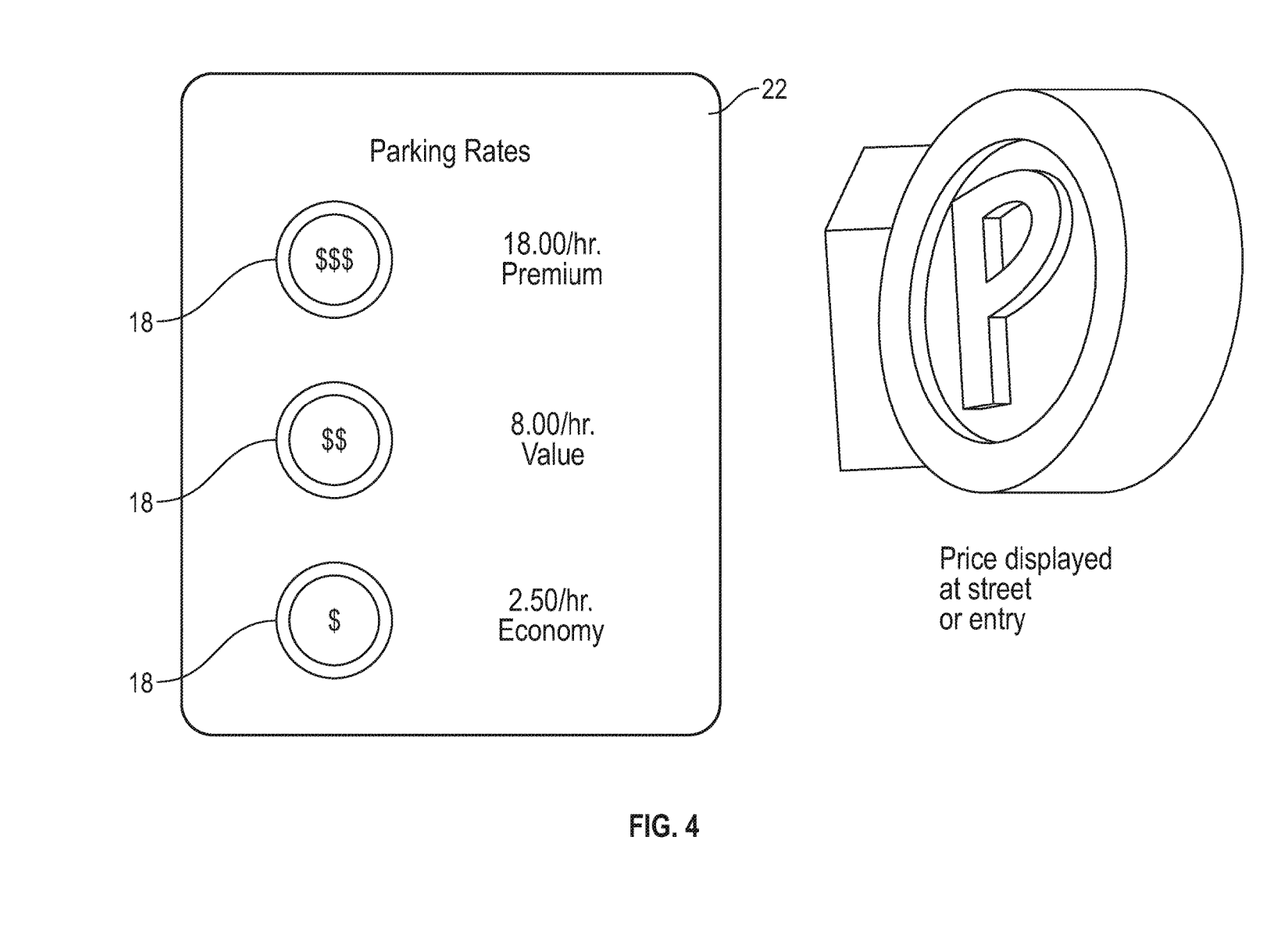
FIG. 4 is view of parking rate notifications of the parking availability system and method of the invention of FIG. 3.

Illustrated in FIG. 4, the real-time parking availability system 10 of the present invention comprises a plurality of parking rate notifications 22 listing current parking rates for the various pricing tiers 18 within the parking facility 20. Parking rate notifications 22 may include, but are not limited to, signs displaying parking prices located on the outside of the parking facility 20 (e.g., street-level), advertisements, electronic notifications to computers, smart phones, and tablets, and/or other means commonly used in the industry. Parking rate notifications 22 may further include software applications for computers, smart phones, and tablets that inform parking consumers 16 of available parking spaces 12 before the parking consumer 16 enters the parking facility 20. The parking rate notifications 22 should be able to adapt, either manually or automatically, to fluctuating market demands for individual parking spaces 12 within the parking facility 20 and therefore timely display updated prices accordingly. The parking notifications 22 are configured to inform a parking consumer 16 approaching a parking facility 20 of the current parking prices in each pricing tier 18 for the parking facility 20.

Figure 5:
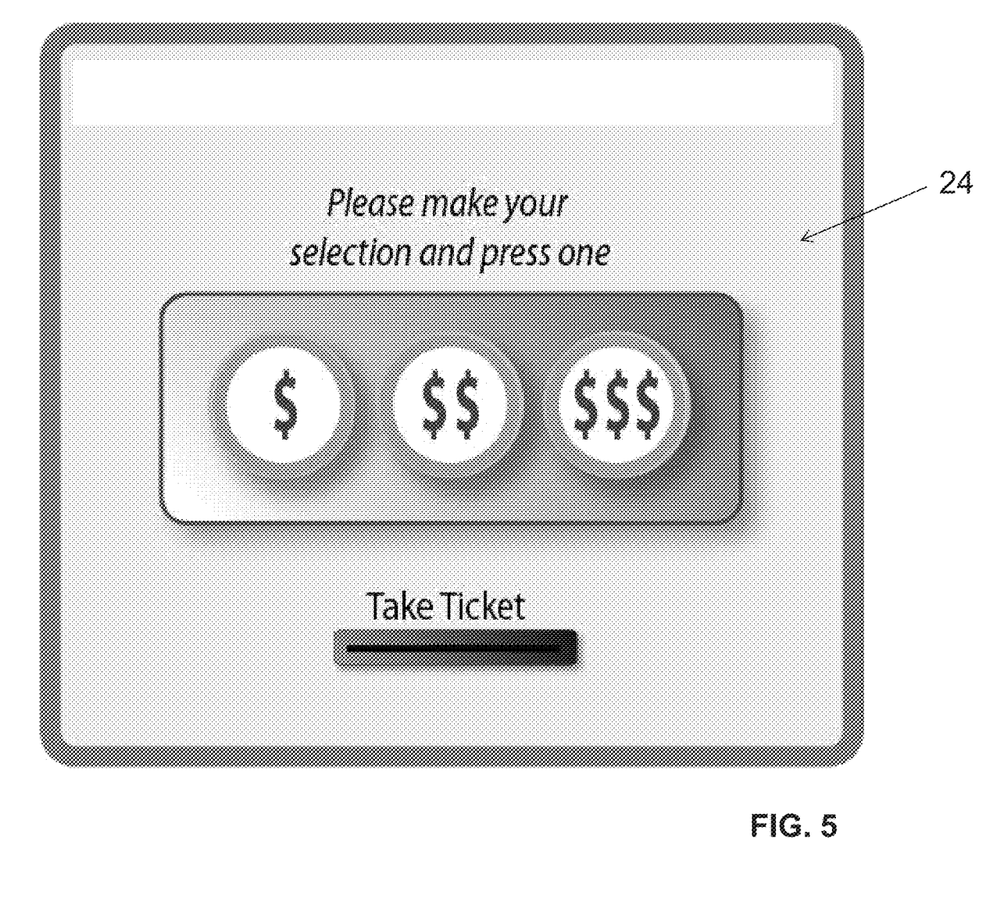
FIG. 5 is a view of a parking selection device of the parking availability system and method of the invention of FIG. 4.

Illustrated in FIG. 5, the real-time parking availability system 10 of the present invention further comprises at least one parking selection device 24 (e.g., kiosk, computer, smart phones, tablet, and/or other means commonly used in the industry). The parking selection device 24 may display the current parking prices in each pricing tier 18 for the parking facility 20, and is configured to allow a parking consumer 16 to select a pricing tier 18 of choice for parking their vehicle within the parking facility 20. The parking selection device 24 may also notify the parking consumer 16 that a portion of his/her parking fee has been automatically donated by the parking asset owner to a charitable organization, wherein the real-time parking availability system 10 is configured to allow an owner to set aside a portion of the parking assets for a donation to a charity of choice. The real-time parking availability system 10 determines in real-time whether an individual parking space 12 is available in the parking tier 18 of choice selected by the parking consumer 16. If an individual parking space 12 is available in the parking tier 18 of choice selected by the parking consumer 16, the parking consumer 16 is directed to the available parking space 12 by the real-time parking availability system 10 of the present invention. On the other hand, if an individual parking space 12 is not available in the parking tier 18 of choice selected by the parking consumer 16, the parking availability system 10 of the present invention may offer real-time solutions, including: (1) creating more parking spaces 12 within the pricing tier 18 of choice; and (2) raising prices for the pricing tier 18 in highest demand within the parking facility 20.

The first solution, creating more parking spaces 12 in the pricing tier 18 of choice, may be accomplished by the parking availability system 10 of the present invention in real-time by converting individual parking spaces 12 in a pricing tier 18 of lower demand into a pricing tier 18 of higher demand. For example, a parking consumer 16 may approach a parking facility 20 and select a value pricing tier 18 at the parking selection device 24. However, default pricing tier 18 settings may have limited the number of parking spaces 12 within the value pricing tier 18, whereas technically there are no parking spaces 12 available within the value pricing tier 18. Nevertheless, the parking system 10 of the present invention overcomes this problem by converting an individual parking space 12 within a lower-demand pricing tier, such as the economy pricing tier, into the value pricing tier 18. The parking consumer 16 is then directed by the parking system 10 to the newly created and available value parking space 12 within the pricing tier 18 of choice. Simply put, even though the default settings of the pricing tiers 18 within a parking facility 20 may indicate that a pricing tier 18 is full (e.g., value), nevertheless, if a parking consumer 16 enters a parking facility 20 and still selects the popular pricing tier 18 (e.g., value), they will be directed access to an available parking space 12 within a pricing tier 18 of lower demand (e.g., economy). Thus, the parking system 10 of the present invention manages individual parking spaces 12 in real-time with fluctuating market rates based on demand, convenience, and location.

The second solution, raising prices for the pricing tier 18 in highest demand within the parking facility 20, may also be accomplished by the parking availability system 10 of the present invention in real-time. For example, a parking consumer 16 may approach a parking facility 20 and select a pricing tier 18 (e.g., premium) at the parking selection device 24. However, default pricing tier 18 settings may have limited the number of parking spaces 12 within the selected pricing tier 18 (e.g., premium) whereas the selected pricing tier 18 is full. The parking consumer 16 may then be notified by the parking system 10 that there are no available parking spaces 12 within the selected pricing tier 18 (e.g., premium), and issued an available parking space 12 within the remaining pricing tiers 18 (e.g., value or economy), preferably the next pricing tier 18 down. The parking system 10 of the present invention then raises the pricing rates for the full, high-demand pricing tier 18 moving forward (e.g., weekly, biweekly, etc.), which reduces demand and increases turnover.

Figure 6:
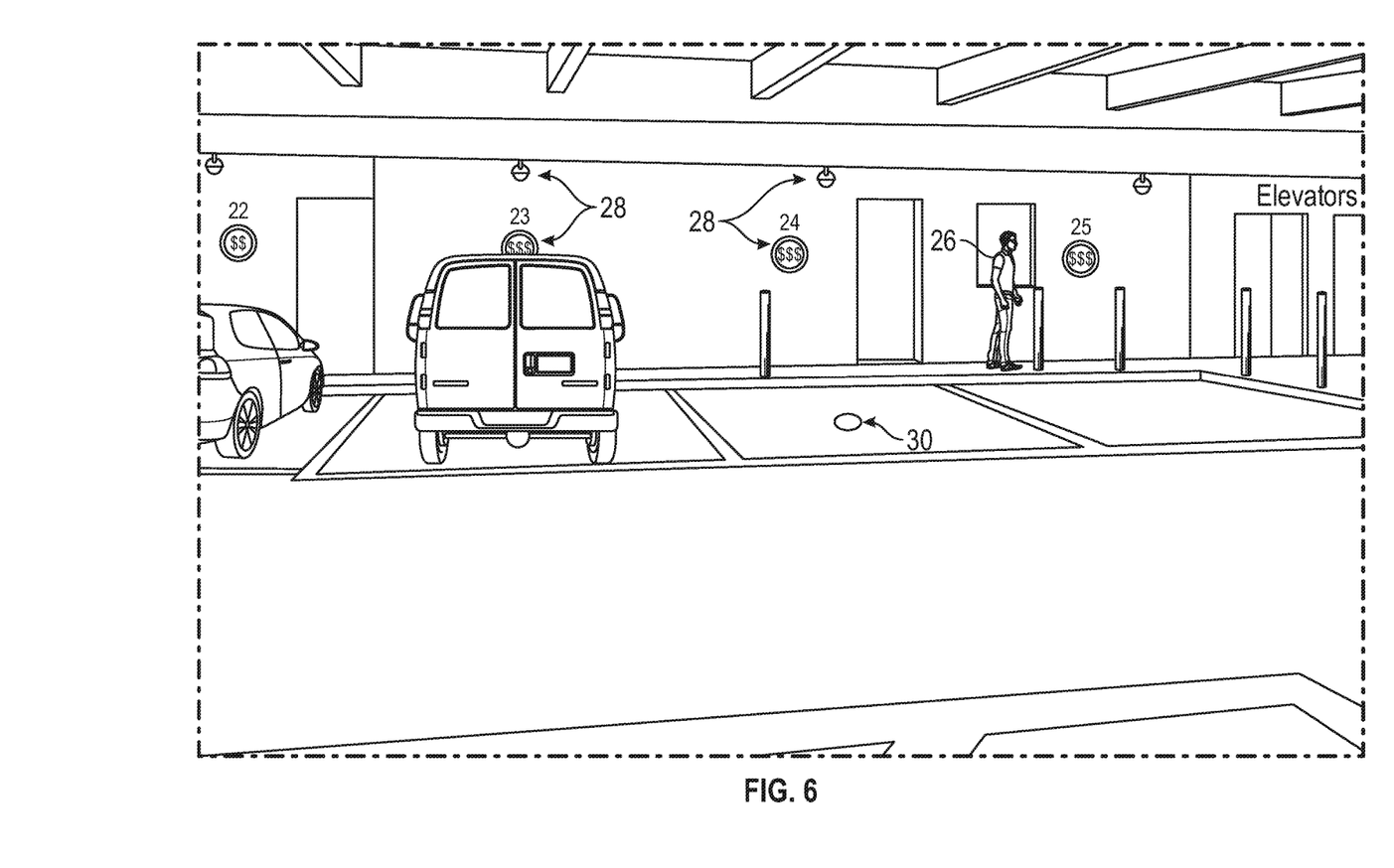
FIG. 6 is a view of the parking sensors and parking indicators of the parking availability system and method of the invention of FIG. 5.

Illustrated in FIG. 6, the real-time parking availability system 10 of the present invention may manage individual parking spaces 12 in real-time using a range of enforcement means including, but not limited to, manual oversight by a mobile parking attendant 26, alarms, and/or parking sensors 30. Such enforcement means ensure a parking consumer 16 parks in an individual parking space 12 within the pricing tier 18 selected by the parking consumer 16 at the parking selection device 24. Preferably, each parking space 12 may be equipped with parking sensors 30 for determining whether a parking space 12 is occupied by a vehicle. The parking sensors 30 may be locally connected to a parking selection device 24, or remotely connected via a server which facilitates communication between the parking sensors 30 and the parking selection device 24. The parking sensors 30 may communicate with the server and parking selection device 24 using a wired or wireless connection to ensure proper parking within the pricing tier 18 chosen by the parking consumer 16. The parking sensors 30 may include automatic vehicle identification, ultrasonic sensors, sonar sensors, and acoustic sensors. The parking sensors 30 may also include camera-based technologies, wherein one parking sensor 30 may be configured to simultaneously monitor several parking spaces 12. Applicable parking sensors 30 may also incorporate pucks fixed onto the street surface or proximate to the parking space 12. It is contemplated that combinations thereof, or other parking sensors 30 commonly used in the industry, may also be utilized. If the real-time parking availability system 10 determines that a parking consumer 16 has parked improperly within a pricing tier not selected at the parking selection device 24, the parking consumer may be issued fines, warnings, and/or fees upon leaving the parking facility 18. It is contemplated that additional enforcement measures may be also be utilized (e.g., towing). Alternatively, a parking ambassador could be utilized by the real-time parking availability system 10 in lieu of a parking attendant. A parking ambassador may be an observer and source of information for the parking consumer 16, ready to assist in answering questions, offering directions, and highlighting points of interest in the locale. Additionally, the parking ambassador may: act as a valet; act as a greeter at an entrance of a parking facility 18 and/or at an individual parking space 12; open vehicle doors for parking consumers 16; assist parking consumers 18 with packages and luggage; offer surveys to parking consumers 18; escort the parking consumer 18 to a location outside the parking facility 18; arrange for other services during the parking consumers 18 visit such as "guarding" the vehicle or finding taxis; charge electronic vehicles; provide car wash and detailing services; and/or other services common in the industry.

Further shown in FIG. 6, the real-time parking availability system 10 of the present invention utilizes parking indicators 28 to inform parking consumers 16 of the status and location of available parking spaces 12 within their pricing tier 18 of choice. The parking indicators 28 may include automated physical signs, icons, or labels to display in real-time up-to-date information regarding availability and pricing tiers 18 for individual parking spaces 12 within the parking facility 20. These parking indicators 28 may signal a parking consumer 16 that their time has expired, a parking space 12 is reserved, clarify that a particular parking permit is required to park, provide a count-down timer, and display the amount of time available at a parking space 12. Such parking indicators 28 may also incorporate electronic displays locally connected to a parking selection device 24, or remotely connected via a server which facilitates communication between the parking indicator 28 and the parking selection device 24. The parking indicators 28 may also include unmanned aerial vehicle ("UAV") and/or unmanned aerial systems ("UAS") technology as a guidance tool to direct parking consumers 16 to individual parking spaces 12 within a parking facility 20. The parking indicators 28 may communicate with the server and parking selection device 24 using a wired or wireless connection. The parking indicators 28 may be prominently displayed high over the individual parking spaces 12, at street-level, or maintain a low-profile by integrating the parking indicator 28 into a parking curb, the floor of the parking facility 20, and/or having the parking indicator 28 serve as a parking curb itself.

Additionally, parking indicators 28 may include digital parking displays (not shown) that that may be broadcast wirelessly to nearby motor vehicles using a wireless transmitter locally connected to the parking selection device 24, or remotely connected to a server. Such digital parking indicators 28 may provide directions to available parking spaces 12 within a parking tier 18 chosen by the parking consumer 16. Digital parking indicators 28 may be broadcast over a publically-accessible network, such as the Internet, and delivered to users electronically through a portable or mobile device with GPS or other location sensing capabilities readily available in the industry.

Further parking indicators 28 may include a color-coded lighting scheme that provides a visual status of available parking, such as incandescent lights, light emitting diodes, reflective surfaces, or other types of lighting schemes commonly used in the industry. For illustrative purposes, one example of a color-coded lighting scheme may incorporate a red light to indicate a parking space 12 is unavailable, a yellow light to indicate that the parking space 12 will be available soon, and a solid green indicator to indicate that the parking space 12 is available. Additional colors may be incorporated into the lighting scheme, such as blue to indicate handicapped parking, orange to indicate permit parking, and purple to indicate official government parking. Color-coded lighting schemes may also incorporate flashing indicators. Such flashing indicators may represent additional qualifiers for individual parking spaces 12 (e.g., expired time is approaching, loading zones, reserved for guests, etc.). Other colors, color combinations, flash strobes, color-coding schemes, and adjusted lighting may also be utilized by parking indicators 28 in the present invention 10. Parking indicators 28 may also incorporate shapes, positions, alphanumeric symbols, and/or icons to differentiate alternating states of parking availability. It is contemplated that the parking indicators 28 of the parking availability system 10 of the present invention may further incorporate combinations of the above.

The parking indicators 28, parking sensors 30, and parking selection device 24 may be coupled via appropriate circuitry and connections to enable the parking availability system 10 to perform the functions and operations described herein. The parking availability system 10 of the present invention comprises suitable components necessary to receive, store and execute appropriate computer instructions. Particularly, the parking availability system 10 includes: storage for electronic program instructions, information and/or data; a display for displaying a user interface and input means; and a processor. The storage may comprise read only memory (ROM) and random access memory (RAM). The parking availability system 10 is configured to receive instructions that may be held in the ROM or RAM and may be executed by the processor. The processor is operable to perform actions under control of electronic program instructions, including processing/executing instructions and managing the flow of data and information through the parking availability system 10. Electronic program instructions for the parking availability system 10 may be provided via a single software application (app) or module. The app can be downloaded from a website (or other suitable electronic device platform) or otherwise saved to or stored on storage of the parking availability system 10. The parking availability system 10 also includes an operating system which is capable of issuing commands and is arranged to interact with the app to cause the device to carry out the respective steps, functions and/or procedures in accordance with the invention described herein. The parking availability system 10 is operable to communicate via one or more communications link(s), which may variously connect to one or more remote servers, personal computers, terminals, wireless or handheld computing devices, landline communication devices, or mobile communication devices such as a mobile (cell) telephone. At least one of a plurality of communications link(s) may be connected to an external computing network through a telecommunications network. The server may be physically located at a centrally managed control station, offsite from the parking facility 20, at the facility itself, or may be held on a cloud based platform.

The server may comprise suitable components necessary to receive, store and execute appropriate electronic program instructions. The components include processing means in the form of a server processor, server storage comprising read only memory (ROM) and random access memory (RAM), one or more server input/output devices such as disc drives, and an associated server user interface. The server may be capable of receiving instructions that may be held in ROM, RAM or disc drives and may be executed by the server processor. The server processor is operable to perform actions under control of electronic program instructions, including processing/executing instructions and managing the flow of data and information through the parking availability system 10.

The server may include a server operating system which is capable of issuing commands to access a plurality of databases or databanks which reside on the storage device thereof. The operating system is arranged to interact with databases and one or more computer programs of a set/suit of server software to cause the server to carry out the respective steps, functions and/or procedures in accordance with the invention described herein. Additionally, information stored in the databases may be obtained from license plate identification readers and/or electronic surveillance, wherein such information may be used to track consumer behavior for taxation purposes, tolls, traffic congestion, price models, taxes, transportation, retail services, corporate real estate, and other services standard in the industry. The app, computer programs of the server software set, and other electronic instructions or programs for the computing components of the parking availability system 10 and the server can be written in any suitable language, as are well known to persons skilled in the art. The electronic program instructions may be provided as stand-alone application(s), as a set or plurality of applications, via a network, or added as middleware, depending on the requirements of the implementation or embodiment. The software may comprise one or more modules, and may be implemented in hardware. In such a case, for example, the modules may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like. The respective computing means can be a system of any suitable type, including: a programmable logic controller (PLC); digital signal processor (DSP); microcontroller; personal, notebook or tablet computer, or dedicated servers or networked servers. The respective processors can be any custom made or commercially available processor, a central processing unit (CPU), a data signal processor (DSP) or an auxiliary processor among several processors associated with the computing means. In embodiments of the invention, the processing means may be a semiconductor based microprocessor (in the form of a microchip) or a macroprocessor, for example.

In the present invention, the respective storage can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The respective storage may incorporate electronic, magnetic, optical and/or other types of storage media. Furthermore, the respective storage can have a distributed architecture, where various components are situated remote from one another, but can be accessed by the processing means. For example, the ROM may store various instructions, programs, software, or applications to be executed by the processing means to control the operation of the parking availability system 10 and the RAM may temporarily store variables or results of the operations.

The use and operation of computers using software applications is well-known to persons skilled in the art and need not be described in any further detail herein except as is relevant to the present invention. Prices may be adjusted automatically in real-time by the management application via use of a demand/supply algorithm or calculation processing the relevant factors. Additional and/or alternative factors may be used in determining dynamic parking conditions and pricing. Once the parking conditions and rates are established, they are logged through the management application to be stored on the server and then communicated to the parking selection device 24. Thus, individual parking spaces 12 may be monitored and prices adjusted in real-time to account for ever-changing market demands. Furthermore, any suitable communication protocol can be used to facilitate connection and communication between any subsystems or components of the parking availability system 10, any subsystems or components of the server, and other devices or systems, including wired and wireless, as are well known to persons skilled in the art and need not be described in any further detail herein except as is relevant to the present invention.

Figure 7:
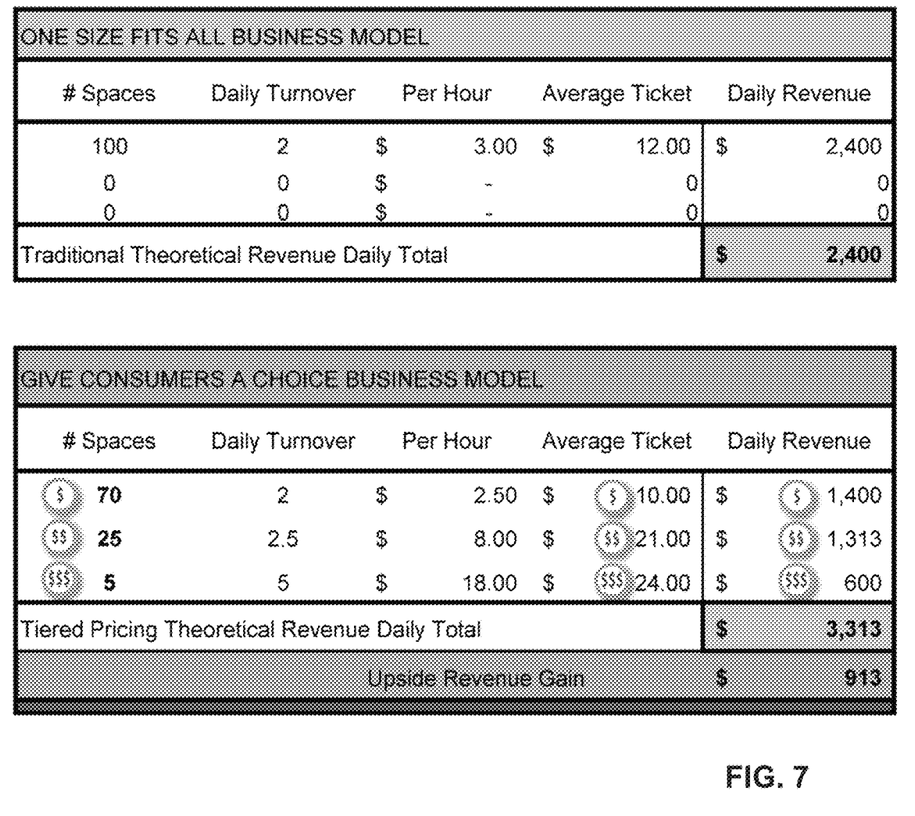
FIG. 7 is a view of the benefits offered by the parking availability system and method of the invention of FIG. 3 over traditional parking models.

Illustrated in FIG. 7, the benefits of managing individual parking spaces 12 in real-time and offering parking consumers 16 a choice in tiered pricing demonstrates that parking asset owners may increase their daily revenue totals by 10-40% or more using the parking availability system 10 and method of parking of the present invention. Additional benefits to parking asset owners include improved service to customers, reducing carbon emissions, mitigating transportation demand, re-investing in value-added parking solutions, saving time through stream-lined parking operations, and demonstrating to the public they are eco-friendly. Benefits to parking consumers 16 include furthering a green initiative, reducing carbon emissions, saving gasoline costs, saving time, and lowering stress and frustration of finding available and convenient parking. Thus, the parking availability system 10 and method of parking using the present invention allows parking asset owners to respond to parking demand with real-time availability and price data, and help them generate significant upside revenues to invest in their parking asset and use sustainable green parking measures.

According to another aspect of the present invention, a method of parking using the parking availability system 10 of the present invention is provided. Illustrated in FIG. 3, the method of the present invention comprises providing a plurality of individual parking spaces 12 managed and sold as individual units within a parking facility 20. These individual parking spaces 12 may be marketed and priced separately in real-time using dynamic market conditions. The method of the present invention further provides offering parking consumers 16 a choice in tiered pricing 18 based on rapidly changing market conditions. For example, a top tier of the tiered pricing 18 may include premium parking spaces of high-demand that are therefore priced expensively ($$$) to encourage rapid turnover. A second tier of the tiered pricing 18 may include value parking spaces of medium-demand that are therefore priced moderately ($$) to encourage a reasonable parking duration. A third tier of the tiered pricing 18 may include economy parking spaces of low-demand that are therefore priced inexpensively ($) to allow for a longer parking duration. The parking asset owner may change the default prices and the distribution of individual parking spaces 12 within each pricing tier 18 to whatever is desired. Depending on events and market conditions, demand will drive the total number of parking spaces 12 in each pricing tier 18 and the price of individual spaces 12 within the pricing tier 18, wherein the price may change hourly, daily, weekly, biweekly, monthly, or seasonally for individual spaces 12 within the parking facility 20. It is understood in the present invention 10 that the default pricing tiers 18, prices, and number of individual parking spaces 12 within each pricing tier 18 may be determined and set by the owner of the parking facility 20 as desired, and are not to be limited by Example 1. Notably, the individual parking spaces 12 within the pricing tiers 18 of the parking facility 20 are not separated into nested areas or detached parking bays with exclusive gated entries. Thus, the real-time parking availability system 10 of the present invention is flexible in allowing individual parking spaces 12 within the parking facility 20 to fluctuate between different pricing tiers 18 based on dynamic market conditions.

Illustrated in FIG. 4, the method of the present invention comprises providing a plurality of parking rate notifications 22 listing current parking rates for the various pricing tiers 18 within the parking facility 20. Parking rate notifications 22 may include, but are not limited to, signs displaying parking prices located on the outside of the parking facility 20 (e.g., street-level), advertisements, electronic notifications to computers, smart phones, and tablets, and/or other means commonly used in the industry. Parking rate notifications 22 may further include software applications for computers, smart phones, and tablets that inform parking consumers 16 of available parking spaces 12 before the parking consumer 16 enters the parking facility 20. The parking rate notifications 22 should be able to adapt, either manually or automatically, to fluctuating market demands for individual parking spaces 12 within the parking facility 20 and therefore timely display updated prices accordingly. The parking notifications 22 are configured to inform a parking consumer 16 approaching a parking facility 20 of the current parking prices in each pricing tier 18 for the parking facility 20.

Illustrated in FIG. 5, the method of the present invention further comprises providing at least one parking selection device 24 (e.g., kiosk, computer, smart phones, tablet, and/or other means commonly used in the industry). The parking selection device 24 may display the current parking prices in each pricing tier 18 for the parking facility 20, and is configured to allow a parking consumer 16 to select a pricing tier 18 of choice for parking their vehicle within the parking facility 20. The parking selection device 24 may also notify the parking consumer 16 that a portion of his/her parking fee has been automatically donated by the parking asset owner to a charitable organization, wherein the real-time parking availability system 10 is configured to allow an owner to set aside a portion of the parking assets for a donation to a charity of choice. The real-time parking availability system 10 determines in real-time whether an individual parking space 12 is available in the parking tier 18 of choice selected by the parking consumer 16. If an individual parking space 12 is available in the parking tier 18 of choice selected by the parking consumer 16, the parking consumer 16 is directed to the available parking space 12 by the real-time parking availability system 10 of the present invention. On the other hand, if an individual parking space 12 is not available in the parking tier 18 of choice selected by the parking consumer 16, the method of the present invention may offer real-time solutions, including: (1) creating more parking spaces 12 within the pricing tier 18 of choice; and (2) raising prices for the pricing tier 18 in highest demand within the parking facility 20.

The first solution, may be accomplished by the method of the present invention in real-time by converting individual parking spaces 12 in a pricing tier 18 of lower demand into a pricing tier 18 of higher demand, effectively creating more parking spaces 12 in the pricing tier 18 of choice. For example, a parking consumer 16 may approach a parking facility 20 and select a value pricing tier 18 at the parking selection device 24. However, default pricing tier 18 settings may have limited the number of parking spaces 12 within the value pricing tier 18, whereas technically there are no parking spaces 12 available within the value pricing tier 18. Nevertheless, the method of the present invention overcomes this problem by converting an individual parking space 12 within a lower-demand pricing tier, such as the economy pricing tier, into the value pricing tier 18. The parking consumer 16 is then directed by the parking system 10 to the newly created and available value parking space 12 within the pricing tier 18 of choice. Simply put, even though the default settings of the pricing tiers 18 within a parking facility 20 may indicate that a pricing tier 18 is full (e.g., value), nevertheless, if a parking consumer 16 enters a parking facility 20 and still selects the popular pricing tier 18 (e.g., value), they will be directed access to an available parking space 12 within a pricing tier 18 of lower demand (e.g., economy). Thus, the parking system 10 of the present invention manages individual parking spaces 12 in real-time with fluctuating market rates based on demand, convenience, and location.

The second solution may also be accomplished by the method of the present invention in real-time by raising prices for the pricing tier 18 in highest demand within the parking facility 20. For example, a parking consumer 16 may approach a parking facility 20 and select a pricing tier 18 (e.g., premium) at the parking selection device 24. However, default pricing tier 18 settings may have limited the number of parking spaces 12 within the selected pricing tier 18 (e.g., premium) whereas the selected pricing tier 18 is full. The parking consumer 16 may then be notified by the parking system 10 that there are no available parking spaces 12 within the selected pricing tier 18 (e.g., premium) and issued an available parking space 12 within the remaining pricing tiers 18 (e.g., value or economy), preferably the next pricing tier 18 down. The method of the present invention then raises the pricing rates for the full, high-demand pricing tiers 18 moving forward (e.g., weekly, biweekly, etc.) which reduces demand and increases turnover.

Illustrated in FIG. 6, the method of the present invention may manage individual parking spaces 12 in real-time using a range of enforcement means including, but not limited to, manual oversight by a mobile parking attendant 26, alarms, and/or parking sensors 30. Such enforcement means ensure a parking consumer 16 parks in an individual parking space 12 within the pricing tier 18 selected by the parking consumer 16 at the parking selection device 24. Preferably, each parking space 12 may be equipped with parking sensors 30 for determining whether a parking space 12 is occupied by a vehicle. The parking sensors 30 may be locally connected to a parking selection device 24, or remotely connected via a server which facilitates communication between the parking sensors 30 and the parking selection device 24. The parking sensors 30 may communicate with the server and parking selection device 24 using a wired or wireless connection to ensure proper parking within the pricing tier 18 chosen by the parking consumer 16. The parking sensors 30 may include automatic vehicle identification, ultrasonic sensors, sonar sensors, and acoustic sensors. The parking sensors 30 may also include camera-based technologies, wherein one parking sensor 30 may be configured to simultaneously monitor several parking spaces 12. Applicable parking sensors 30 may also incorporate pucks fixed onto the street surface or proximate to the parking space 12. It is contemplated that combinations thereof, or other parking sensors 30 commonly used in the industry, may also be utilized. If the real-time parking availability system 10 determines that a parking consumer 16 has parked improperly within a pricing tier not selected at the parking selection device 24, the parking consumer may be issued fines, warnings, and/or fees upon leaving the parking facility 18. It is contemplated that additional enforcement measures may be also be utilized (e.g., towing). Alternatively, a parking ambassador could be utilized by the method of the present invention in lieu of a parking attendant. A parking ambassador may be an observer and source of information for the parking consumer 16, ready to assist in answering questions, offering directions, and highlighting points of interest in the locale. Additionally, the parking ambassador may: act as a valet; act as a greeter at an entrance of a parking facility 18 and/or at an individual parking space 12; open vehicle doors for parking consumers 16; assist parking consumers 18 with packages and luggage; offer surveys to parking consumers 18; escort the parking consumer 18 to a location outside the parking facility 18; arrange for other services during the parking consumers 18 visit such as "guarding" the vehicle or finding taxis; charge electronic vehicles; provide car wash and detailing services; and/or other services common in the industry.

Further shown in FIG. 6, the method of the present invention further provides parking indicators 28 to inform parking consumers 16 of the status and location of available parking spaces 12 within their pricing tier 18 of choice. The parking indicators 28 may include automated physical signs, icons, or labels to display in real-time up-to-date information regarding availability and pricing tiers 18 for individual parking spaces 12 within the parking facility 20. These parking indicators 28 may signal a parking consumer 16 that their time has expired, a parking space 12 is reserved, clarify that a particular parking permit is required to park, provide a count-down timer, and display the amount of time available at a parking space 12. Such parking indicators 28 may also incorporate electronic displays locally connected to a parking selection device 24, or remotely connected via a server which facilitates communication between the parking indicator 28 and the parking selection device 24. The parking indicators 28 may also include unmanned aerial vehicle ("UAV") and/or unmanned aerial systems ("UAS") technology as a guidance tool to direct parking consumers 16 to individual parking spaces 12 within a parking facility 20. The parking indicators 28 may communicate with the server and parking selection device 24 using a wired or wireless connection. The parking indicators 28 may be prominently displayed high over the individual parking spaces 12, at street-level, or maintain a low-profile by integrating the parking indicator 28 into a parking curb, the floor of the parking facility 20, and/or having the parking indicator 28 serve as a parking curb itself. Thus, the method of the present invention utilizes the parking availability system 10 to manage individual parking spaces in real-time with fluctuating market rates based on demand, convenience, and location.

The parking availability system 10 and method of parking of the present invention is intended to use green technology, practices, and strategies to achieve LEED certification. The parking availability system 10 and method of parking of the present invention are universally applicable to parking facilities 18 of all shapes and sizes, locations, and constructions and is intended to use green technology, practices, and strategies throughout to achieve LEED certification. Furthermore, while intended for personal vehicles, the parking availability system 10 and method of parking of the present invention may be used for vehicles of all sizes, makes, models, and manufacturers. Although the invention has been described and illustrated with respect to preferred aspects thereof, it is not to be so limited since changes and modifications may be made therein which are within the full intended scope of the invention.

What is claimed is:
1. A real-time parking availability system, comprising:
a parking facility;
a plurality of individual parking spaces within the parking facility;
a plurality of pricing tiers for the individual parking spaces within the parking facility;
a percentage of the plurality of individual parking spaces allocated to a pricing tier;
at least one parking selection device, the at least one parking selection device comprising:
 a) a display listing parking prices for the plurality of pricing tiers for the individual parking spaces that are within the parking facility; and
 b) an option to select a pricing tier from the plurality of pricing tiers for the individual parking spaces that are within the parking facility, wherein the at least one parking selection device is configured to receive a selection of the pricing tier;

at least one parking sensor in communication with the at least one parking selection device;

the at least one parking sensor configured to determine in real-time whether an individual parking space is available in a selected pricing tier;

a management application automatically adjusting parking prices for the plurality of pricing tiers for the individual parking spaces in real-time based on demand;

the management application in communication with the at least one parking selection device and the at least one parking sensor; and the management application configured to provide two real-time solutions when an individual parking space within the selected pricing tier is not available in the parking facility:
  a) the first real-time solution comprising electronically creating a new individual parking space within the selected pricing tier by reallocating an available individual parking space within a pricing tier of lower demand into the selected pricing tier; and
  b) the second real-time solution comprising decreasing demand for individual parking spaces within a pricing tier of higher demand in the parking facility by increasing prices for the individual parking spaces within the pricing tier of higher demand;

wherein daily revenue totals for the parking facility improve compared to flat fee pricing.

2. The real-time parking availability system of claim 1, further comprising:
  at least one parking indicator in communication with the at least one parking selection device and the at least one parking sensor and the management application;
  the at least one parking indicator configured to notify a consumer of a location of an available parking space within the selected pricing tier.

3. The real-time parking availability system of claim 1, further comprising:
  automatic donation to a charitable organization; and
  notification by the at least one parking selection device that a portion of a parking consumer's parking fee has been donated to the charitable organization.

4. The real-time parking availability system of claim 1, wherein demand is driven by dynamic market conditions comprising location, walking distance, time of day, day of the week, holidays, special events, number of car occupants, personal safety, weather conditions, or combinations thereof.

5. The real-time parking availability system of claim 2, further comprising:
  a plurality of parking rate notifications in communication with the at least one parking selection device and the at least one parking sensor and the management application and the at least one parking indicator; and
  the plurality of parking rate notifications configured to display the plurality of pricing tiers for the individual parking spaces within the parking facility.

6. The real-time parking availability system of claim 1, wherein the at least one parking sensor comprises automatic vehicle identification, ultrasonic sensors, sonar sensors, acoustic sensors, motion detection, camera-based technologies, or combinations thereof.

7. The real-time parking availability system of claim 5, wherein the plurality of parking rate notifications are configured to notify a consumer of available individual parking spaces allocated to a pricing tier before the consumer enters the parking facility.

8. The real-time parking availability system of claim 2, wherein the at least one parking indicator includes automated physical signs, electric signs, digital parking displays, color-coded lighting schemes, unmanned aerial vehicle technology, or combinations thereof.

9. A parking facility, comprising:
  a plurality of individual parking spaces within the parking facility;
  a plurality of pricing tiers for the individual parking spaces within the parking facility, comprising:
    a) a first pricing tier, wherein the first pricing tier includes premium individual parking spaces;
    b) a second pricing tier, wherein the second pricing tier includes value individual parking spaces priced lower than the premium individual parking spaces;
    c) a third pricing tier, wherein the third pricing tier includes economy individual parking spaces priced lower than the value individual parking spaces;
  a first percentage of the plurality of individual parking spaces allocated to the first pricing tier;
  a second percentage of the plurality of individual parking spaces allocated to the second pricing tier;
  a third percentage of the plurality of individual parking spaces allocated to the third pricing tier;
  at least one parking selection device, the at least one parking selection device comprising:
    a) a display listing parking prices for the plurality of pricing tiers for the individual parking spaces that are within the parking facility; and
    b) means for selecting a pricing tier from the plurality of pricing tiers for the individual parking spaces that are within the parking facility, wherein the at least one parking selection device is configured to receive a selection of the pricing tier;
  at least one parking sensor in communication with the at least one parking selection device, the at least one parking sensor configured to determine in real-time whether an individual parking space is available in a selected pricing tier;
  a management application in communication with the at least one parking selection device and the at least one parking sensor, the management application configured to provide two real-time solutions when an individual parking space within the selected pricing tier is not available in the parking facility:
    a) the first real-time solution comprising electronically creating a new individual parking space within a pricing tier of higher demand by reallocating an available individual parking space within a pricing tier of lower demand into the pricing tier of higher demand; and
    b) the second real-time solution comprising decreasing demand for individual parking spaces within a pricing tier of higher demand in the parking facility by increasing prices for the individual parking spaces within the pricing tier of higher demand;
  at least one parking indicator in communication with the at least one parking selection device and the at least one parking sensor and the management application, the at least one parking indicator configured to notify a consumer of a location of an available individual parking space within the selected pricing tier;
  the at least one parking sensor configured to determine whether the consumer parks in the available individual parking space within the selected pricing tier;
  the management application, in communication with the at least one parking selection device and the at least one parking sensor, configured to calculate demand for each pricing tier of the plurality of pricing tiers in real-time;

the management application configured to automatically adjust parking prices for the plurality of pricing tiers in real-time based on the demand;

a plurality of parking rate notifications in communication with the at least one parking selection device and the at least one parking sensor and the management application and the at least one parking indicator, the plurality of parking rate notifications configured to display the plurality of pricing tiers for the individual parking spaces within the parking facility; and the plurality of parking rate notifications and the display of the at least one parking selection device configured to list current parking prices for the plurality of pricing tiers that have been adjusted by the management application in real-time based on demand;

wherein the pricing tier of higher demand is capable of being any of the plurality of pricing tiers depending on dynamic market conditions;

wherein daily revenue totals for the parking facility improve compared to flat fee pricing.

10. The parking facility of claim 9, wherein the at least one parking indicator is configured to provide directions to available individual parking spaces within the selected pricing tier.

11. The parking facility of claim 9, further comprising:
automatic donation to a charitable organization;
wherein the display of the at least one parking selection device notifies parking consumers that a portion of a parking fee has been automatically donated to a charitable organization.

12. The parking facility of claim 9, wherein the at least one parking sensor comprises automatic vehicle identification, ultrasonic sensors, sonar sensors, acoustic sensors, motion detection, camera-based technologies, or combinations thereof.

13. The parking facility of claim 9, wherein the means for selecting a pricing tier comprises pressing an icon on the at least one parking selection device.

14. The parking facility of claim 9, wherein the at least one parking indicator comprises automated physical signs, electric signs, digital parking displays, color-coded lighting schemes, unmanned aerial vehicle technology, or combinations thereof.

15. A method of managing a parking facility, comprising:
providing a parking facility;
distributing a plurality of individual parking spaces within the parking facility;
establishing a plurality of pricing tiers for the individual parking spaces, the plurality of pricing tiers comprising:
  a) a first pricing tier;
  b) a second pricing tier, wherein the second pricing tier includes individual parking spaces priced at a lower value than individual parking spaces in the first pricing tier;
  c) a third pricing tier, wherein the third pricing tier includes individual parking spaces priced at a lower value than individual parking spaces in the second pricing tier;
allocating a first percentage of the plurality of individual parking spaces to the first pricing tier;
allocating a second percentage of the plurality of individual parking spaces to the second pricing tier;
allocating a third percentage of the plurality of individual parking spaces to the third pricing tier;

providing at least one parking selection device;
listing parking prices for the plurality of pricing tiers on a display of the at least one parking selection device;
providing an option on the at least one parking selection device to select a pricing tier from the plurality of pricing tiers;
selecting a pricing tier from the plurality of pricing tiers via the at least one parking selection device;
providing at least one parking sensor in communication with the at least one parking selection device;
determining in real-time whether an individual parking space is available within the selected pricing tier in the parking facility via the at least one parking sensor;
providing direction to the available individual parking space within the selected pricing tier in the parking facility;
providing a management application in communication with the at least one parking selection device and the at least one parking sensor;
providing two real-time solutions when no individual parking space within the selected pricing tier is available in the parking facility;
the first real-time solution comprising:
  a) designating an available individual parking space within a pricing tier of lower demand;
  b) reallocating the available individual parking space within the pricing tier of lower demand into the selected pricing tier;
  c) electronically creating a new individual parking space within the selected pricing tier;
  d) providing direction to the new individual parking space within the selected pricing tier;
the second real-time solution comprising:
  a) providing notification that an individual parking space within the selected pricing tier is unavailable via the at least one parking selection device;
  b) designating an available individual parking space within another pricing tier;
  c) providing direction to the available individual parking space within the other pricing tier; and
  d) decreasing demand for the individual parking spaces within a pricing tier of higher demand in the parking facility by increasing prices for the individual parking spaces within the pricing tier of higher demand to increase turnover;
providing at least one parking indicator in communication with the at least one parking selection device and the at least one parking sensor and the management application, wherein the at least one parking indicator is configured to provide the direction to the new individual parking space or to the available individual parking space;
determining whether a consumer parks in an individual parking space within the selected pricing tier via the at least one parking sensor;
calculating demand for each pricing tier of the plurality of pricing tiers in real-time via the management application in communication with the at least one parking selection device and the at least one parking sensor;
automatically adjusting parking prices for the plurality of pricing tiers in real-time based on the demand via the management application;
providing a plurality of parking rate notifications in communication with the at least one parking selection device and the at least one parking sensor and the management application and the at least one parking indicator;

displaying the plurality of pricing tiers for the individual parking spaces within the parking facility via the plurality of parking rate notifications; and listing current parking prices for the plurality of pricing tiers that have been adjusted by the management application in real-time based on demand via the plurality of parking rate notifications and the display of at least one parking selection device;

wherein the pricing tier in higher demand is capable of being any pricing tier depending on dynamic market conditions;

wherein daily revenue totals for the parking facility improve compared to flat fee pricing.

16. The method of claim 15, further comprising:

the at least one parking sensor comprising automatic vehicle identification, ultrasonic sensors, sonar sensors, acoustic sensors, motion detection, camera-based technologies, or combinations thereof; and the at least one parking indicator comprising automated physical signs, electric signs, digital parking displays, color-coded lighting schemes, unmanned aerial vehicle technology, or combinations thereof.

17. The method of claim 15, further comprising:

automatically donating to a charitable organization a portion of a parking consumer's parking fee; and the at least one parking selection device notifying the parking consumer that a portion of the parking consumer's parking fee has been donated to the charitable organization.

18. The method of claim 15, further comprising:

including automatic vehicle identification with the at least one parking sensor;

storing vehicle information obtained from the at least one parking sensor in at least one database; and tracking consumer behavior with the vehicle information stored in the at least one database.

19. The method of claim 15, further comprising:

providing a means of enforcement if the at least one parking sensor determines the consumer improperly parks within a pricing tier not selected via the at least one parking selection device.

* * * * *